Figure 1:
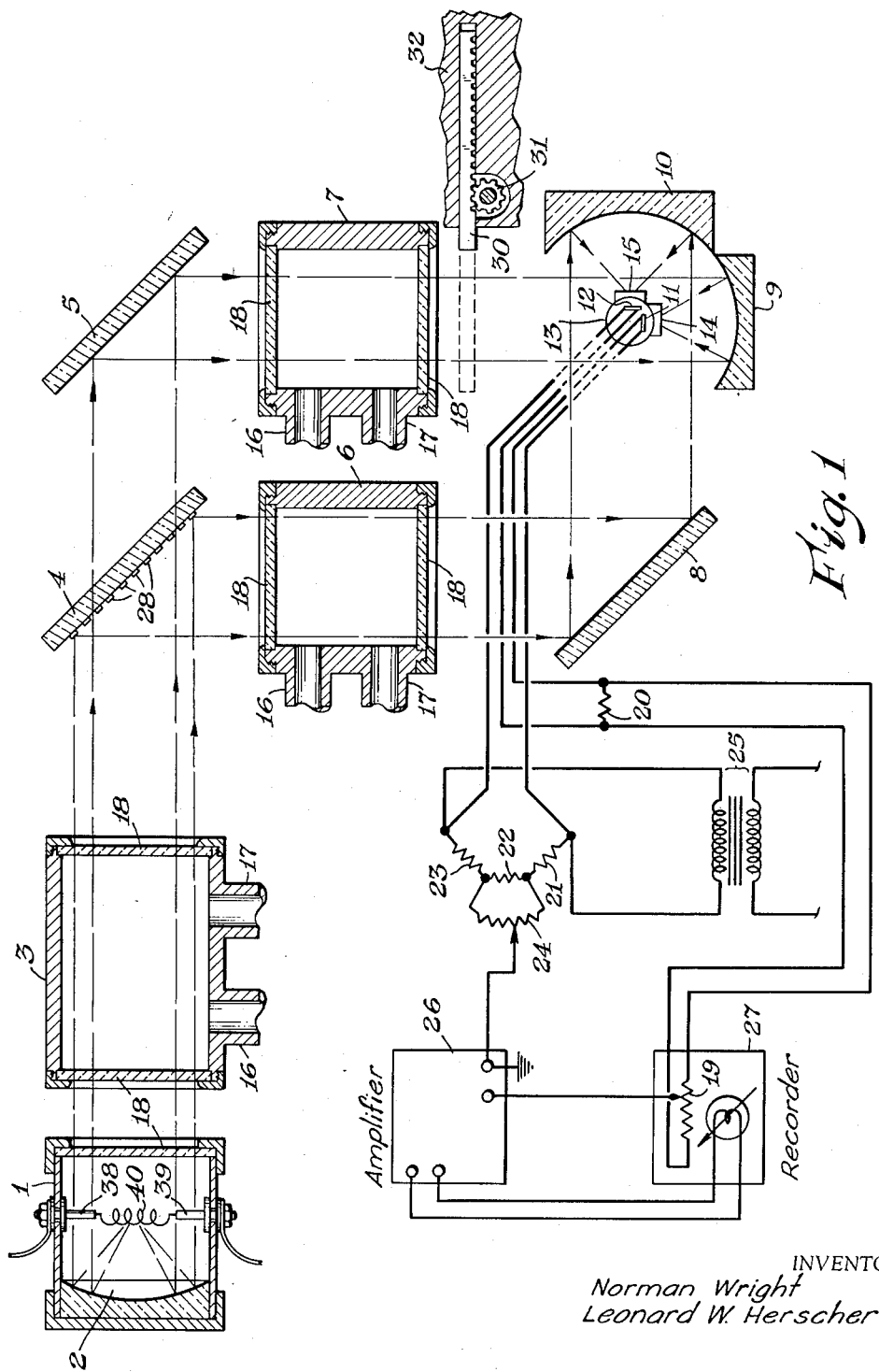

March 6, 1956  N. WRIGHT ET AL  2,737,591
METHOD AND APPARATUS FOR ANALYSIS
AND CONTROL OF ORGANIC SYSTEMS
Filed April 18, 1952  2 Sheets-Sheet 2

INVENTORS
Norman Wright
Leonard W. Herscher

BY Griswold & Burdick
ATTORNEYS

United States Patent Office 2,737,591
Patented Mar. 6, 1956

2,737,591

METHOD AND APPARATUS FOR ANALYSIS AND CONTROL OF ORGANIC SYSTEMS

Norman Wright and Leonard W. Herscher, Midland, Mich., assignors to The Dow Chemical Company, Midland, Mich., a corporation of Delaware Application April 18, 1952, Serial No. 283,056

10 Claims. (Cl. 250—43.5)

This invention concerns an improved method and apparatus for analyzing organic mixtures, either as individual samples or in a continuous manner during travel of such mixture to, through, or from a system for handling the mixture, and also for automatically controlling such system in accordance with the analysis of the mixture.

The method and apparatus of the invention are an improvement over those described by one of us in U. S. Patents 2,386,830 and 2,386,831. Each of said patents discloses an apparatus comprising a source of infrared light; two light-responsive means, exposed to separate beams of light from said source, each of which means includes a substance for absorbing light of a desired wave length and, in thermal contact with the substance, a thermocouple or equivalent device such as a thermopile or a bolometer for producing or varying an electric current in accordance with changes in temperature resulting from the absorption of light; and, interposed between the source of light and one or both of said means, a sample cell having windows transparent to infrared light and containing the mixture which is to be analyzed. For convenience, light-responsive "means" such as those just mentioned are hereinafter termed "detectors." In Patent 2,386,830 the sample to be analyzed is interposed in both of the beams of light and the light-absorptive substance of one of the detectors has a strong light-absorptive band corresponding to a distinctive light-absorption band of the component of the mixture to be determined by the analysis, whereas the light-absorptive substance of the other detector either has a strong light-absorptive band corresponding in wave length to a distinctive light-absorption band of another component of the mixture to be analyzed or its stronger light-absorption bands do not correspond to those of any of the components of the mixture to be analyzed. In Patent 2,386,831 the mixture to be analyzed is interposed between the light source and only one of the detectors, but each of the detectors includes a light-absorptive substance having a strong light-absorptive band corresponding in wave length to a distinctive light absorption-band of the component, of the mixture, which is to be determined by the analysis. In each of said patents, the two light-responsive detectors are electrically connected with their electric potentials in opposition and with a galvanometer, or other electric-responsive element, in the circuit. A galvanometer, when employed, may be calibrated to indicate the proportion of a certain component in the mixture being analyzed. Alternatively, the current or voltage developed by the pair of detectors may be amplified and used to control a system for handling or producing the mixture subjected to the analysis, e. g. vapors from an upper section of a continuously operating still may be fed to the analyzer and the electric current or voltage from the latter may be amplified and used to control the rate of feed to the still so as to obtain efficient fractionation and produce a distillate or a residue of uniform composition.

The method and apparatus of each of said Patents 2,386,830 and 2,386,831 is effective in rapidly and accurately analyzing organic mixtures in continuous manner as long as the cells of the apparatus, particularly the sample cell containing the mixture to be analyzed, are clean and free from accumulations of dirt, dust, moisture, or other substances in a phase different from that of the mixture to be analyzed which absorb, reflect, or otherwise obstruct the passage of light. The cells of the apparatus, other than the sample cell, contain materials of known composition and no particular difficulty is involved in maintaining them clean. However, the mixtures to be analyzed often contain, or carry with them, minor amounts of dirt, finely divided solid particles, moisture, or gas bubbles in a liquid mixture to be analyzed, and errors in analysis often result from accumulation of such substances in, or on the windows of, the sample cell during flow of the mixture through the cell. The reason for such errors is that the current or voltage from the instrument, and the analysis indicated, are dependent upon the relative amounts of light energy absorbed by the two detectors and such accumulations of dirt or moisture in, or on, the sample cell usually obstruct the beam of light directed to one of the detectors to greater extent than the beam of light directed to the other detector and thus cause an error.

It is an object of this invention to provide an improved method and apparatus for the analysis of organic mixtures, and for control of systems handling such mixtures, which remain of good accuracy even when undissolved, light-interfering substances are in, or on, the sample cell. Other objects will be evident from the following description of the invention.

The invention consists essentially of passing a single beam of infrared light through a sample cell, containing the mixture to be analyzed; directing the transmitted light against a plate which both transmits and reflects the infrared light, thereby splitting the single beam from the light source into two beams, i. e. a transmitted beam and a reflected beam; directing one of these beams to a light-responsive detector which is strongly absorptive to light of a distinctive wave length absorbed more strongly by the component to be determined in the analysis than by the other components of the mixture subjected to the analysis; and directing the other beam to a light-responsive detector which does not strongly absorb light of said distinctive wave length, but does absorb light of other wave lengths, each of which detectors develops, or varies, an electric current or potential to an extent proportionate to the absorbed light energy. The detectors are connected with their electric potentials in opposition and with a galvanometer or other electric-responsive element in the circuit, e. g. as described in the aforementioned U. S. Patents 2,386,830 and 2,386,831. The invention, pertains especially to an improved analyzer for accomplishing the above-stated steps.

It is important that infrared light of the distinctive wave length, or band of wave lenths, absorbed by the component to be determined in the analysis (but not by the other components of the mixture subjected to analysis) be strongly absorbed by one of the light-responsive detectors but not by the other. This may be accomplished by having present in one of the detectors a light-absorptive substance, e. g. a gas, liquid, or solid, which has a strong light-absorptive band corresponding to the distinctive light absorption band of the component to be determined by the analysis and having present in the other detector a substance which is not strongly absorptive of light in said band of wave lengths, but is absorptive of light of other wave lengths, e. g. of a wave length strongly absorbed by another of the components of the mixture being analyzed. Alternatively, both of the detectors may include a substance, or substances, capable of absorbing light of the wave lengths strongly absorbed by the component to be determined in the analysis, as well as being absorptive of infrared light of other wave lengths, in which case one or more light filters are interposed between the sample cell and one or both of the detectors for purpose of absorbing and removing light of the wave lengths which are not to be absorbed by the detectors.

Any plate, or solid sheet having a property of both transmitting and reflecting infrared light can be used to split the beam of infrared light transmitted through the sample cell, and a number of substances, e. g. cuprous sulfide, and metallic selenium, have this property. Usually, such substance is deposited as a thin film on one face of a supporting plate of a substance such as crystalline rock salt, or lithium fluoride, etc., which is transparent to infrared light of the region used.

For best results, it is desirable that the plate used for splitting the beam of infrared light be one which produces a transmitted light beam and a reflected light beam of about the same quality, i. e. so that the light of one beam will be of approximately the same wave lengths in about the same relative intensities as the light of the other beam. It is also desirable that only a minor amount, e. g. 10% or less, of the single beam of light transmitted through the sample to be analyzed be absorbed by the plate used for splitting the beam. An extremely thin continuous film of cuprous sufide deposited on a base member, such as rock salt, which is transparent to infrared light, has the property of splitting a beam of infrared light to produce a transmitted beam and a reflected beam of about the same quality, but has an undesirable property of absorbing a considerable amount, e. g. about one-third, of the energy of the infrared light to which the film is exposed. Thin continuous films of other substances, e. g. selenium, which are capable of splitting a beam of infrared light are either highly absorptive of the light, or produce a transmitted light beam and a reflected beam of different qualities. Although any such continuous film, capable of splitting a beam of infrared light, can be employed in the invention, continuous films are less desirable than a field of separated reflected surfaces for the purpose.

Plates for splitting a beam of infrared light into a transmitted beam and a reflected beam are best prepared by depositing a light-reflective substance such as gold, rhodium, or palladium, etc., as closely spaced spots, or as bands surrounding uncovered spots, on, or in, a plate of a supporting substance, such as rock salt or lithium fluoride, etc. preferably so that about half of the exposed area of the plate is reflective to the light and half of the plate area is transparent.

Since all of the infrared light used in the analysis first passes as a beam through the mixture to be analyzed and thereafter is split into two beams that are used to activate the respective light-responsive detectors which are electrically connected and which develop, or vary, an electric current or voltage in accordance with the relative amounts of light energy absorbed by the respective detectors, an accumulation of particles of dirt or moisture on windows of the sample cell has approximately equal effect on the amount of light energy received by the two detectors, i. e. it has little or no effect on the ratio of light energy absorbed by the respective detectors, and therefore does not cause an appreciable change, or error, in the analytical reading given by the instrument.

It might be thought that particles of dirt or moisture would, in some instances, screen light from the transparent portions of the light-splitting plate to a greater or lesser extent than from the light-reflective portions of the plate area and thereby cause error in the analytical reading of the instrument. Such errors have not occurred to appreciable extent and are not believed possible. The reason why a considerable error cannot occur from such cause is that the source of the infrared light is not a point, but is of appreciable size. Accordingly the light passing through the sample cell comprises a large number of overlapping light cones. The cone-shaped shadow of a small particle of dirt or moisture in the sample cell is enlarged when cast on the light splitting plate so as to cover several light-transparent regions between the reflective regions. Because of this the effect of a dirt particle in reducing the amount of light energy transmitted through the sample cell is distributed almost equally between the transmitted and reflected beams of light from the light-splitting plate. It may be mentioned that surrounding and overlapping cones of light tend to illuminate the shadowed area of the light splitting plate, so that the shadow, although present, may not be readily seen.

The accompanying drawing illustrates, in schematic manner, certain of the forms and arrangements of apparatus which may be employed in practice of the invention.

In Fig. 1, the analyzer is shown as comprising an infrared lamp 1, a sample cell 3, a light-splitting plate 4, reflectors 5, 8, 9 and 10, light filter cells 6 and 7 and a cell 13 which is provided with windows 14 and 15 and houses light responsive detectors 11 and 12 having a property of absorbing light and of generating or varying an electric current or voltage in accordance with the amount of light energy absorbed. The analyzer preferably includes an opaque member, e. g. a rod, 30 which can be advanced, by gear 31 in a housing 32, into a beam of light so as to screen a desired amount of light from detector 11. Such movable rod can be used to equalize the light energy absorbed by the detectors 11 and 12 so as to establish a condition of balance. However, rod 30 is not required and can be omitted. The analyzer is shown as connected, by dotted lines, with an external circuit which includes a transformer, 25, connected with a source, not shown, of an alternating electric current; fixed resistances 20, 21, 22 and 23; variable resistances 24 and 19, the latter preferably being part of a recorder 27 which automatically varies the resistance 19 as necessary to maintain the bridge shown in balance; and an amplifier 26. All of the parts shown in the electric circuit are known in the art. In place of this electric circuit, other circuits including a Wheatstone bridge, an amplifier, and a recorder, e. g. the thermopile circuits shown in U. S. Patents 2,386,830 and 2,386,831 or the circuit shown in J. of Optical Soc. of America, vol. 36, No. 4, page 198 (1946), which latter circuit is similar to that shown in Fig. 1 of the accompanying drawing, may be employed. In place of an alternating current, a direct current from a battery or other source may be fed to the electric circuit, but an alternating current is most conveniently used.

In Fig. 1 the lamp 1 and cells 3, 6 and 7 are shown at least partly in cross section. Lamp 1 comprises a reflector 2 and a pair of conductors 38 and 39 extending through side walls of the lamp and having a filament 40 therebetween. Lamp 1 and each of the cells 3, 6 and 7 are provided with windows 18, e. g. of rock salt or lithium fluoride, transparent to infrared light. The windows 14 and 15 of cell 13 are also transparent to the light and may be of similar materials.

Each of the cells 3, 6 and 7 is provided with an inlet 16 and outlet 17 for passage of fluid therethrough, which inlets and outlets may be provided with valves, not shown, that can be closed to retain samples of fluids in the cells. The reflectors 2, 5, 8, 9 and 10 serve to direct the paths of light from lamp 1 and to focus light on the detectors 11 and 12.

Figure 2:
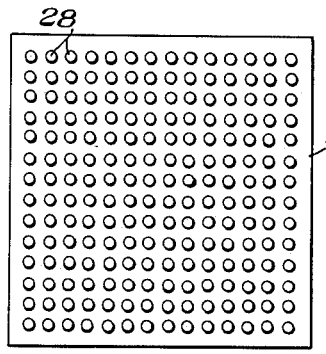
Figure 3:
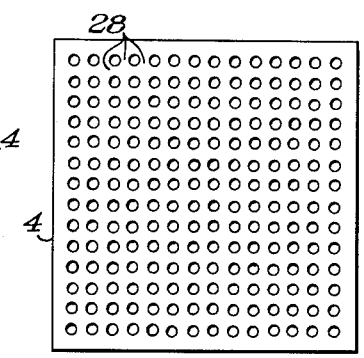

Plate 4 of Fig. 1 is both transparent and reflective to infrared light and serves to split a single beam of the light into a transmitted beam and a reflected beam. The plate 4 of Fig. 1 is shown in greater detail, and in two alternative forms, in Figs. 2 and 3. It comprises a supporting plate of a substance, such as rock salt or lithium fluoride, which is transparent to infrared light and, deposited in film form as small regions, e. g. as round spots of about 2 mm. diameter, on a face of the plate, a light reflective metal, 28, such as gold, rhodium, palladium, etc. In Fig. 2 the metal 28 is shown as being deposited as spots on a face of the supporting plate with uncovered, i. e. transparent, regions between the spots. In Fig. 3, the metal 28 is shown as a network of bands on the supporting plate with intervening uncovered regions that are transparent to the light. The metal film may be cemented to the supporting plate or be applied in various ways. It is usually deposited as spots on the supporting plate by covering an extended surface of the plate with a perforated mask, e. g. of metal, and contacting the mask and the underlying exposed surfaces of the plate with metal vapors produced by heating a light-reflective metal, preferably gold, in a closed container under vacuum. The metal is preferably distributed over an effective area of a face of the plate in a manner such as to cover approximately half of said area. A light reflective plate which is perforated for passage of light through the perforations may also be used for splitting the beam of light.

Figure 4:
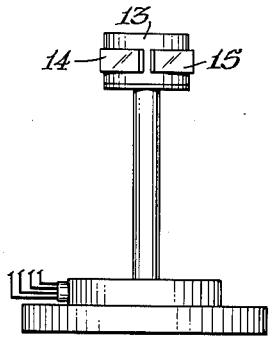
Figure 5:
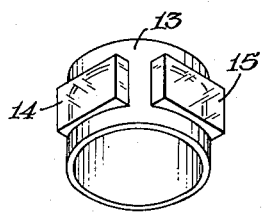
Figure 7:
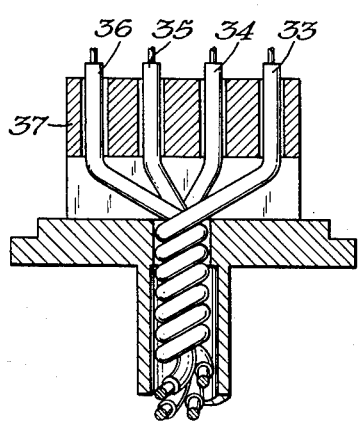
Figure 6:
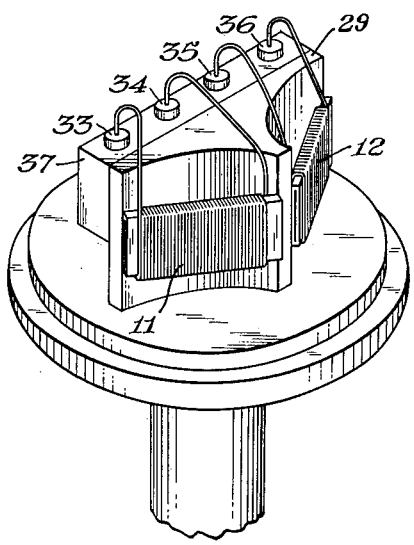

The detector cell 13, and a support and other parts thereof, are shown in detail in Figs. 4–7 of the drawing. Fig. 4 is a frontal view of cell 13 and its support. Fig. 5 shows a removable metal cap, constituting the housing for the bolometers 11 and 12, which cap is provided with windows 14 and 15 for the transmission of infrared light. The cap is also numbered 13, since it is the cap which is seen in a top view of cell 13. Fig. 6 shows said bolometers, and supports for the same, as exposed by removal of the cap. Each of the bolometers 11 and 12 is a coil of wire, having an appreciable temperature electric resistivity coefficient, on a solid core, such as a sheet of cardboard, cellulose acetate, or polystyrene, etc., which core is cemented, or otherwise attached, to a metal block 29. Both the coil of wire and its core are provided with a light-absorptive, e. g. a black coating. The bolometer wires are connected, at their ends, with heavier insulated wires 33—36 that extend through a block 37 and then through a bore of the support and lead to terminals for connection with an electric measuring circuit such as that shown in Fig. 1. Fig. 7 is a rear view, in cross section, of a portion of the support for the bolometers. It shows the conductors 33—36 leading from the bolometers, extending into the bore of the support.

Although the detectors 11 and 12 are preferably bolometers, any kind of detectors, absorptive to light of the distinctive wave lengths absorbed by the substance to be determined in the analysis and having a property of generating, or varying, an electric current or potential in accordance with the amount of light energy absorbed, may be used. The detectors 11 and 12 may be housed in separate cells, or containers, but are preferably housed, as shown, in a single cell having a heat-conductive outer surface, e. g. of copper, silver, aluminum, or other metal. Such common housing has an effect of distributing outside temperature changes evenly to the two detectors, which are electrically connected with their potentials in opposition, and thus prevents occurrence of an error in the analysis due to a change in the surrounding temperatures.

When the detectors 11 and 12 are bolometers, it is necessary that one of the light-filters 6 and 7 absorb a large proportion of light of the distinctive band of wave lengths absorbed by the component to be determined in the analysis and that it transmit light of other wave lengths. The other of these filters may be omitted, but is usually employed. If used, said other filter is advantageously one which transmits light of the distinctive band of wave lengths absorbed by the component to be determined in the analysis, but absorbs infrared light of other wave lengths. Any light filters having the respective properties just stated may be used in the invention. In Fig. 1, the light filters 6 and 7 are shown as cells which may be filled with substances having the necessary light filtering properties. For instance, one of the cells 6 and 7 may be filled with a compound corresponding to the component, of a mixture, which is to be determined in the analysis and the other of said cells may be filled with a compound corresponding to one of the other components of the mixture subjected to analysis.

Instead of using bolometers as the detectors 11 and 12, the latter may be thermopiles, or resistance wires, in thermal contact with substances which are selectively absorptive to infrared light of the wave lengths which it is desired be absorbed by the respective detectors. For instance, one of the detectors may be an unblackened wire wound on a core, e. g. a film, of a solid material which has a strong light absorptive band corresponding to the distinctive light absorptive band of the substance to be determined by the analysis and which is not strongly absorptive of infrared light of other wave lengths; and the other detector may be a winding of unblackened wire on a core which is not strongly absorptive of light of said distinctive band of wave lengths, but is strongly absorptive of infrared light of other wave lengths. When using such pair of detectors, comprising substances having different and selective light absorption properties, the light filters 6 and 7 shown in Fig. 1 may be omitted.

Instead of, or in addition to, employing a recorder, as indicated in Fig. 1, the current or voltage from the analyzer can be amplified and used in known manner to control automatically a variable of a system for producing the mixture which flows through the sample cell 3 of the analyzer, so as to assure formation of a product of uniform composition. For instance, the analyzer may thus be used to control automatically the rate of feed of a mixture of normal butylenes and 1,3-butadiene to a still where the mixture is subjected in continuous manner to an azeotropic distillation with ammonia for purpose of separating the butylene from the 1,3-butadiene. The application of an infrared analyzer for automatic control of such distillation is fully described in U. S. Patents 2,386,830 and 2,386,831. The improved analyzer of this invention may similarly be employed.

Prior to use, the analyzer is tested with known mixtures and the recorder 27 is preferably calibrated to indicate the proportion of a given component in the mixture to be analyzed. This is accomplished by passing several mixtures of certain ingredients in known proportions, which mixtures contain varying proportions of said component, through the sample cell 3 under exposure to infrared light from lamp 1 and calibrating the galvanometer readings of the recorder 27 in accordance with the known proportions of said component in the mixtures passed through cell 3. Thereafter, another mixture of the same kinds of ingredients in unknown proportions may be passed through cell 3 to obtain a recorder reading which indicated directly the proportion of the above-mentioned component in the mixture.

For example, 1,3-butadiene is strongly absorptive of light having a wave length of approximately 6.25 mu. whereas 1-butylene and 2-butylene do not possess strong light absorption bands corresponding to said value. In using the apparatus of Fig. 1 for the analysis of mixtures of butadiene and said butylenes, one of the light filter cells 6 and 7 is filled with butadiene, or with another substance having a strong light absorption band corresponding to that of butadiene. The other of said cells may be filled with a substance, e. g. 1-butylene, 2-butylene or a mixture thereof, which does not have a strong light absorption band corresponding to the distinctive light absorption band of butadiene, but which is strongly absorptive of light of other wave lengths. A mode of using the last-mentioned filter cell to overcome the light-absorptive effects of an ingredient having light absorption bands that overlap on those of the ingredient to be determined is described by Hasegawa et al. in Proc. of 28th annual meeting of Am. Petrol. Inst. III, vol. 28, page 73, (1948). For such purpose, the filter cell is charged with a suitable concentration of the ingredient having the overlapping and interfering light absorption bands. Alternatively, the last-mentioned filter cell may be omitted.

Several mixtures of 1,3-butadiene, 1-butylene and 2-butylene, containing known proportions of the butadiene are passed through cell 3 under exposure to infrared light from lamp 1 and the resultant readings on the scale of the recorder 27 are marked to indicate the respective known proportions of butadiene in the mixtures passed through cell 3. After thus calibrating the apparatus, other mixtures of the butylene and butadiene in unknown proportions may be passed through cell 3 to obtain readings of the recorder 27 which indicate directly the proportions of butadiene in the mixtures.

Other organic mixtures containing a component having a strong infrared light absorption band distinct from that of other components of the mixtures may similarly be analyzed. The expression "distinct light absorption band" as employed herein, pertains to a band of wave lengths of light which is absorbed by the component to be determined in the analysis, but which is absorbed to a relatively slight extent, or not at all, by the other ingredients of the mixture subjected to the analysis.

We claim:

1. An analytical apparatus comprising an infrared lamp, a container for material to be analyzed, which container is provided with walls transparent to infrared light and permitting passage of such light through the container and is positioned in the path of light from said lamp, a stationary plate in the path of a beam of light transmitted through the container, which plate is reflective of and transmissive to the light at a number of regions throughout an extended area of the same so that the plate is capable of splitting the light beam into a transmitted beam and a reflected beam, both of which split light beams originate from the same general area of the plate, said stationary plate being positioned a distance from the above-mentioned container such that a particle of a light-absorptive material in the container obstructs light about equally from the light transmitting and light reflective portions of the area of the plate, means for directing the reflected and transmitted beams of light from said plate to detectors, each of which is absorptive of light and which has a property of altering an electric potential in accordance with the amount of light energy absorbed and which detectors are connected with their potentials in opposition, and a means in the path of at least one of the beams of light from the plate for absorbing infrared light of certain wave lengths more strongly than light of other wave lengths so that only certain of the wave lengths of light are strongly absorbed by the detector.

2. An analytical apparatus, as claimed in claim 1, wherein the plate for splitting a beam of infrared light comprises a continuous film of material which is both reflective of and transparent to infrared light.

3. An analytical apparatus, as claimed in claim 1, wherein the plate for splitting a beam of light into a reflected beam and a transmitted beam comprises a supporting plate which is transparent to infrared light and, evenly distributed throughout the effective extended area of the plate, a number of spots of a light-reflective material.

4. An analytical apparatus, as claimed in claim 1, wherein the plate for splitting a beam of infrared light comprises a supporting plate, transparent to the light, which plate has a light-reflective metal deposited in film form and as regions on an extended surface of the supporting plate throughout an effective surface area of the plate in a manner which leaves intervening regions of said surface uncovered and transparent to the light.

5. An analytical apparatus, as claimed in claim 4, wherein the light-reflective metal is gold.

6. An analytical apparatus, as claimed in claim 4, wherein the detectors are bolometers and a light filter is interposed in a path of light between each bolometer and the plate for splitting a beam of light, which light filters differ from one another as to the wave lengths of infrared light that are selectively absorbed thereby.

7. An analytical apparatus, as claimed in claim 4, wherein the detector wires are supported on, and in thermal contact with, outer surfaces of solid materials that selectively absorb infrared light of certain wave lengths, which solid materials differ from one another as to the wave lengths of infrared light selectively absorbed thereby.

8. An analytical apparatus, as claimed in claim 1, wherein the detector wires are supported on, and in thermal contact with, outer surfaces of solid materials that selectively absorb infrared light of certain wave lengths, which solid materials differ from one another as to the wave lengths of infrared light selectively absorbed thereby.

9. An analytical apparatus, as claimed in claim 1, wherein the detector wires are supported on, and in thermal contact with, outer surfaces of solid materials that selectively absorb infrared light of certain wave lengths, which solid materials differ from one another as to the wave lengths of infrared light selectively absorbed thereby.

10. An analytical apparatus comprising an infrared lamp, a container for material to be analyzed, which container is provided with walls transparent to infrared light and permitting passage of such light through the container and is positioned in the path of light from said lamp, a stationary perforated plate of a light reflective material in the path of a beam of light transmitted through the container, which plate is perforated at a number of closely spaced points rendering it reflective of, and transmissive to, the light at a number of regions throughout an extended area of the same so that the plate is capable of splitting the light beam into a transmitted beam and a reflected beam, both of which split light beams originate from the same general area of the stationary perforated plate, said plate being positioned a distance from the above-mentioned container such that a particle of a light-absorptive material in the container obstructs light about equally from the light transmitting and light reflective portions of the area of the plate, means for directing the reflected and transmitted beams of light from said plate to detectors, each of which is absorptive of light and which has a property of altering an electric potential in accordance with the amount of light energy absorbed and which detectors are connected with their potentials in opposition, and a means in the path of at least one of the beams of light from the plate for absorbing infrared light of certain wave lengths more strongly than light of other wave lengths so that only certain of the wave lengths of light are strongly absorbed by the detector.

References Cited in the file of this patent

UNITED STATES PATENTS

| | | |
|---|---|---|
| 1,482,070 | Douglass | Jan. 29, 1924 |
| 1,999,023 | Sharp et al. | Apr. 23, 1935 |
| 2,256,855 | Zobel | Sept. 23, 1941 |
| 2,386,830 | Wright | Oct. 16, 1945 |
| 2,386,831 | Wright | Oct. 16, 1945 |
| 2,525,445 | Canada | Oct. 10, 1950 |

OTHER REFERENCES

Recording Infra-Red Analyzers for Butadiene and Styrene Plant Streams by N. Wright et al. Journal of Optical Society April 1946, pp. 195–202.